(12) United States Patent
Kowalchuk (10) Patent No.: US 7,673,736 B2
(45) Date of Patent: Mar. 9, 2010

(54) CONVEYOR SYSTEM WITH GATE READER ASSEMBLY

(75) Inventor: Dan Kowalchuk, Port Hope (CA)

(73) Assignee: Labotix Automation Inc., Peterborough, ON ( * ) Notice: Subject to any disclaimer, the term of this patent is extended or adjusted under 35 U.S.C. 154(b) by 324 days.

(21) Appl. No.: 11/866,752

(22) Filed: Oct. 3, 2007

(65) Prior Publication Data

US 2009/0090597 A1    Apr. 9, 2009

(51) Int. Cl.
B65G 47/00 (2006.01)
(52) U.S. Cl. ............. 198/478.1; 198/479.1; 198/502.3; 198/339.1; 198/341.05
(58) Field of Classification Search ............. 198/339.1, 198/341.05, 341.07, 376, 377.02, 383, 384, 198/394, 413, 478.1, 479.1, 502.3
See application file for complete search history.

(56) References Cited

U.S. PATENT DOCUMENTS

| | | | |
|---|---|---|---|
| 2,920,739 A | | 1/1960 | Woldin |
| 3,286,814 A | | 11/1966 | Atkinson |
| 3,441,120 A | | 4/1969 | McGill |
| 3,556,279 A | | 1/1971 | Cotter et al. |
| 3,941,686 A | * | 3/1976 | Juvinall ..................... 209/523 |
| 4,084,686 A | | 4/1978 | Calhoun |
| 4,280,612 A | | 7/1981 | Nagano |
| 4,624,098 A | | 11/1986 | Trendel |
| 4,714,515 A | | 12/1987 | Hoffmann |
| 4,854,441 A | | 8/1989 | McBrady et al. |
| 4,915,237 A | * | 4/1990 | Chang et al. ................. 209/524 |
| 5,040,661 A | | 8/1991 | Yasuda et al. |
| 5,058,724 A | | 10/1991 | Hinton |
| 5,082,520 A | | 1/1992 | West et al. |
| 5,150,782 A | | 9/1992 | Richter |
| 5,269,864 A | | 12/1993 | Otruba |
| 5,373,934 A | * | 12/1994 | Jackson et al. ............ 198/803.8 |
| 5,755,335 A | * | 5/1998 | Michelotti et al. ........... 209/528 |
| 5,810,955 A | | 9/1998 | Seifert et al. |
| 6,024,204 A | | 2/2000 | van Dyke, Jr. et al. |
| 6,116,404 A | * | 9/2000 | Heuft et al. ............... 198/339.1 |
| 6,298,974 B1 | * | 10/2001 | Heuft et al. ............... 198/339.1 |
| 6,374,989 B1 | | 4/2002 | van Dyke, Jr. et al. |
| 7,438,192 B1 | * | 10/2008 | Kohler et al. ................ 209/523 |

* cited by examiner

Primary Examiner—Douglas A Hess (57) ABSTRACT

A gate reader assembly for positioning and identifying articles carried by conveyor systems. The gate reader assembly including a main housing for attachment to said conveyor adjacent a conveyor line of the conveyor; a sprocket rotatably mounted on said housing and having a plurality of gullets formed thereon, each gullet configured for receiving one of said articles. In addition, said sprocket is configured to rotate about an axis normal to said conveyor line via a horizontal force from said articles such that said rotating sprocket is configured to receive and move said articles along said conveyor line. The gate reader assembly additionally includes a detent mechanism disposed on the housing and slidably coupled to the sprocket for releasably restraining said sprocket from rotation thereby inhibiting said article against further movement along said conveyor line. The gate reader assembly further includes a reader subassembly for mounting on said housing and for identifying said articles when restrained by said detent mechanism.

16 Claims, 6 Drawing Sheets

CONVEYOR SYSTEM WITH GATE READER ASSEMBLY

FIELD OF THE INVENTION

The invention relates generally to conveyor systems, and more particularly to a gate reader assembly for positioning and identifying articles carried by such conveyor systems.

BACKGROUND OF THE INVENTION

Currently, a variety of conveyor systems exist in the art which are used for inspecting, identifying, controlling movement and processing of articles such as containers located on a conveyor line. Inspection machines used with conveyors can include a means for moving the articles from the conveyor line to an inspecting station where the articles are examined for flaws or other physical characteristics as necessary. For example, a controlling apparatus such as a star wheel is used to control the path of the articles on the conveyor. The controlling apparatus engages the path defined by the conveyor line to receive the articles travelling along the conveyor line for inspection. In this way, the articles are only transferred back to the conveyor line if they pass the requirements of the inspection operation and are otherwise redirected onto a different set of conveyor which may serve to discard the article. This approach may be disadvantageous as it is time consuming to redirect the articles away from their main path of travel in order to process them.

Other known conveyor systems include labelling machines which interact with the conveyor line and a number of containers travelling thereon. The labelling machines often also include a synchronization apparatus which engages and receives the containers, and subsequently releases the containers at predefined time periods onto the conveyor in time for engagement and labelling by a label transport system. This approach also interferes with the normal flow of the containers on the conveyor line.

Other known conveyor systems for processing articles such as clinical containers employ a plurality of conveyors and a control assembly. The control assembly is located on the conveyor system and is used to examine and process the containers using identification labels. The control assembly then redirects the containers to another conveyor line for further testing and processing accordingly.

The difficulty with these conveyor systems is that they generally interrupt the travel path of articles along the conveyor line in order to provide the appropriate processing such as identification, examination and the like. The processing means employed are time consuming and hinder the continuous movement of the articles along the conveyor line by redirecting the articles away from the main conveyor onto other conveyor lines for subsequent testing and/or processing.

In addition, these types of conveyor systems are complex to manufacture and require precise synchronization between a multitude of processing and conveyor systems to prevent adjacent articles from jamming against one another and possibly causing breakage.

Accordingly, there is a need for a conveyor system and processing assembly that minimally interferes with the path of travel of articles on the conveyor system. Therefore, it is an object of the present invention to obviate or mitigate at least some of the above-presented disadvantages.

SUMMARY OF THE INVENTION

In accordance with an aspect of the present invention there is provided a gate reader assembly configured to identify articles travelling on a conveyor, the gate reader assembly comprising: a main housing configured for attachment to said conveyor adjacent a conveyor line of the conveyor; a sprocket rotatably mounted on said housing and having a plurality of gullets formed thereon, each gullet configured for receiving one of said articles, said sprocket configured to rotate about an axis normal to said conveyor line via a horizontal force from said articles, said rotating sprocket configured to receive and move said articles along said conveyor line; a detent mechanism disposed on the housing and slidably coupled to the sprocket for releasably restraining said sprocket from rotation thereby inhibiting said article against further movement along said conveyor line; and a reader subassembly configured for mounting on said housing and for identifying said articles when restrained.

In another aspect, the gate reader assembly additionally comprises a reader rotate wheel and a drive means configured for rotating said reader rotate wheel such that said reader rotate wheel frictionally engages and rotates said article when restrained.

In yet another aspect, the sprocket is coupled to the reader rotate wheel via torque coupling and the torque coupling comprises a frictional slip coupling for causing said drive means to rotate said sprocket with said reader rotate wheel along said axis until restrained.

In another of its aspects, said reader subassembly comprises a plurality of sensors for detecting positioning of said received article and at least one scanner for scanning and identifying said received article when restrained.

In another of its aspects, said sprocket comprises a plurality of teeth annularly formed thereon each pair of teeth defining the corresponding gullet therebetween, said gullets and teeth sized to accommodate a predefined clearance between said received article and adjacent articles.

BRIEF DESCRIPTION OF THE DRAWINGS

Exemplary embodiments of the invention will now be described in conjunction with the following drawings, in which.

DETAILED DESCRIPTION OF THE PREFERRED EMBODIMENTS

Figure 2:
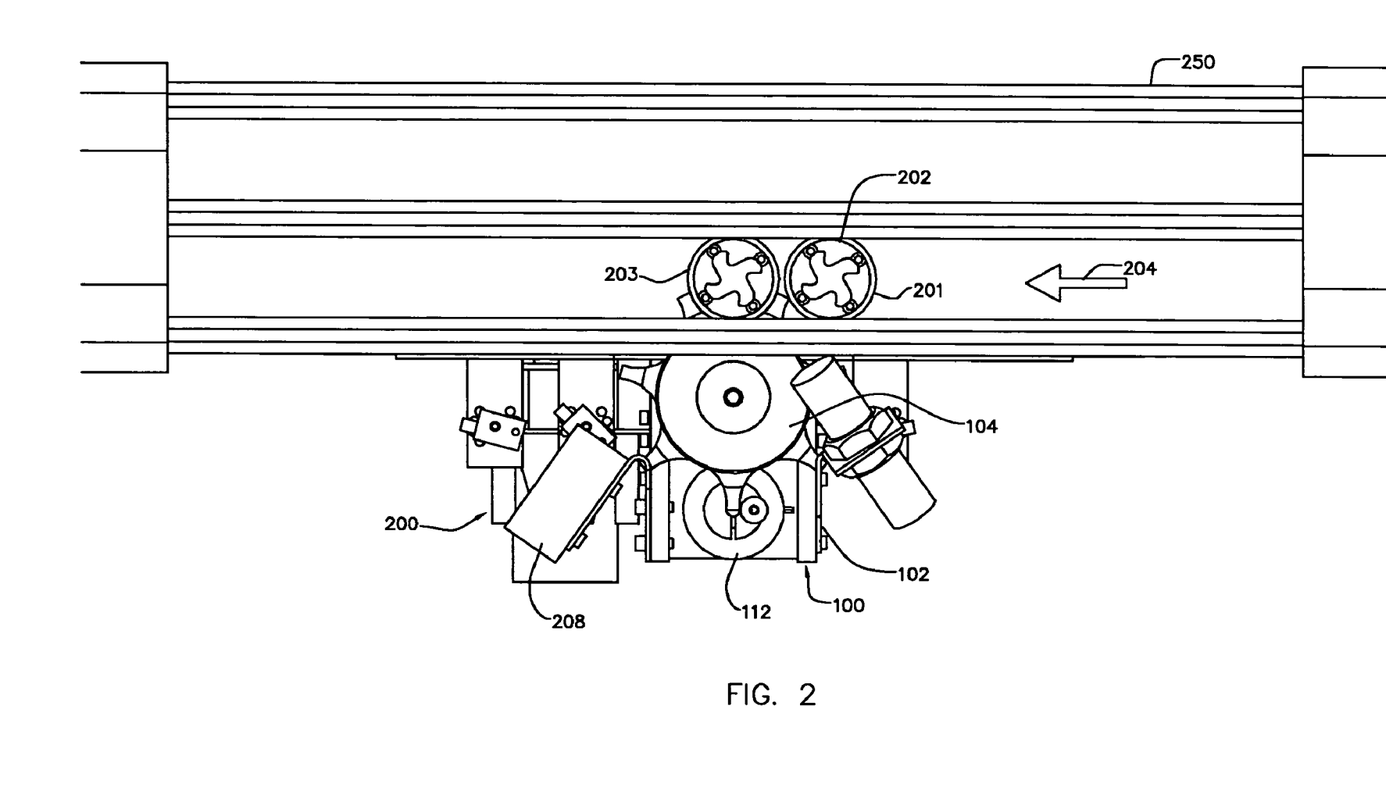
FIG. 2 is a plan view of a gate reader assembly having the gate subassembly of FIG. 1.
Figure 3:
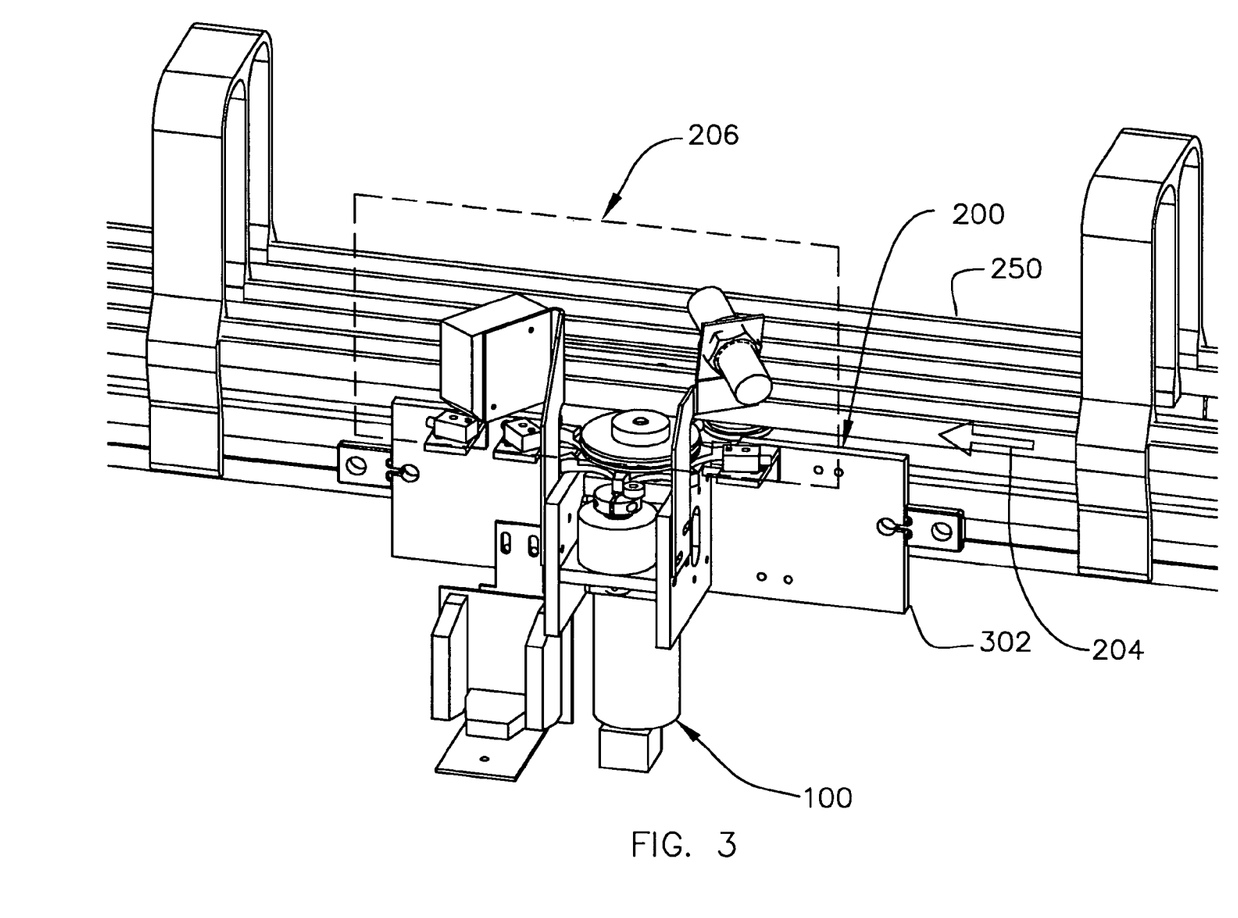
FIG. 3 is an isometric view of the gate reader assembly of FIG. 2.

For convenience, like reference numerals in the description refer to like structures in the drawings. Referring to FIGS. 2 and 3, a gate reader assembly for use with a conveyor system is illustrated generally by numeral 200. The gate reader assembly 200 comprises an index gate 100 and a reader subassembly 206. The conveyor system includes a conveyor line 250 for transporting articles 202. The gate reader assembly 200 is mounted on the conveyor line 250 via attachment means 302.

As will be described, the gate reader assembly 200 is adapted to position, examine and identify the articles 202. In effect, the index gate 100 engages the articles 202 and controls their flow such that the articles 202 are properly positioned for subsequent examination and identification via the reader subassembly 206. The reader subassembly 206 senses the positioning of the articles 202 and scans them such that they are identified for subsequent distribution and sorting by the conveyor system.

As will be understood by a person skilled in the art, the conveyor line 250 may carry laboratory containers such as laboratory specimen sample carriers used in clinical testing as well as other types of articles such as bottles, cans or carriers. Further, the conveyor line 250 may include, for example, a continuous conveyor belt movably supported by a conveyor frame and controlled via a drive assembly. However, other known conveyor lines may be used to accommodate the types of articles 202 carried.

Figure 1:
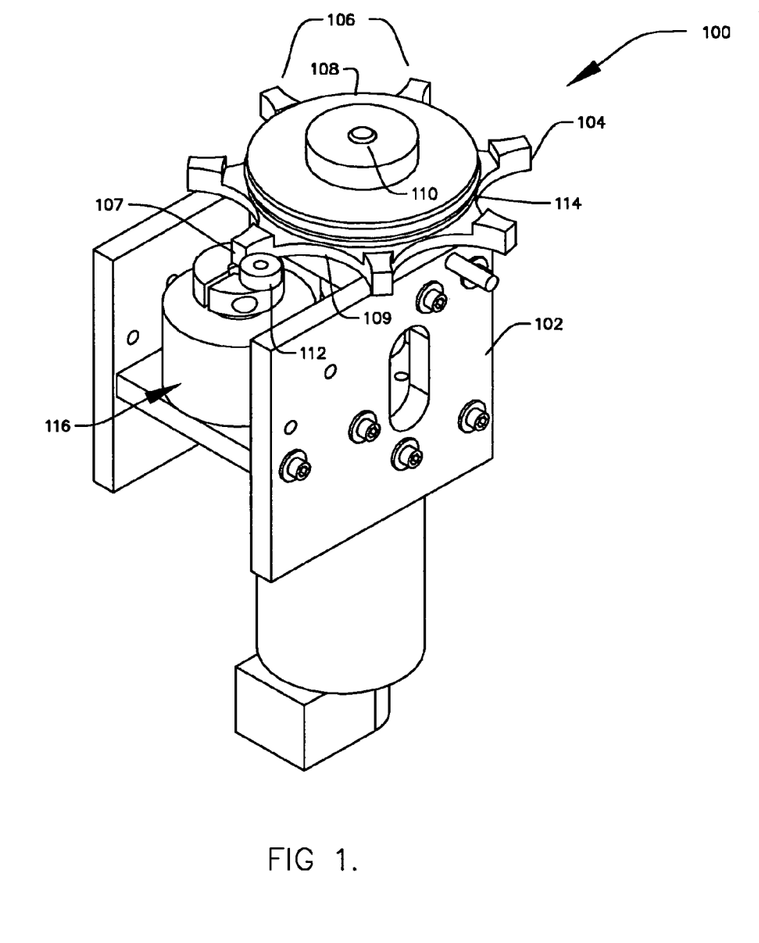
FIG. 1 is a side elevation view of a gate subassembly according to one embodiment.
Figure 5:
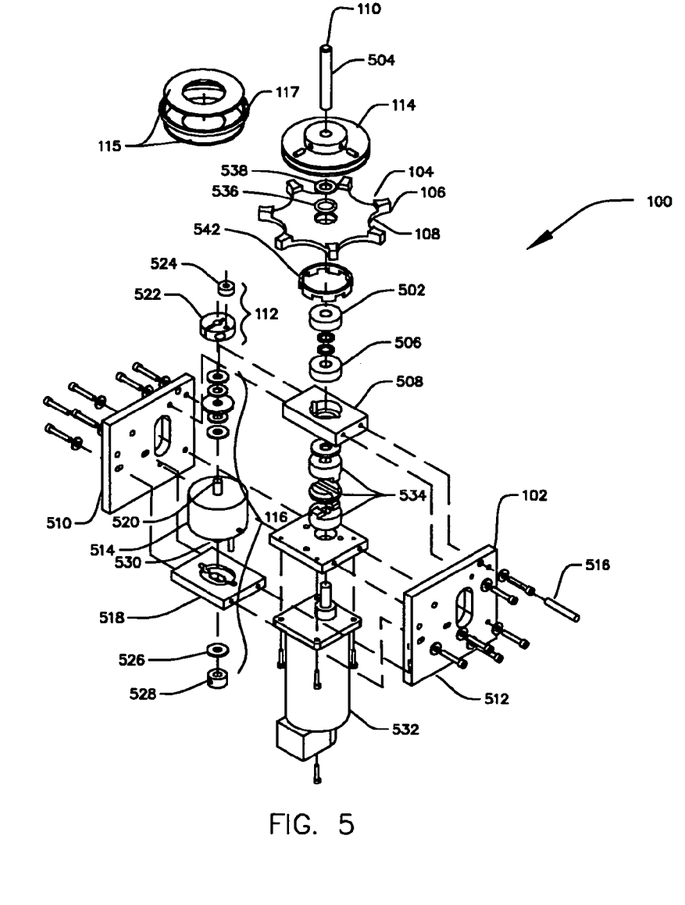
FIG. 5 is an exploded isometric view of the gate subassembly of FIG. 1.

Referring to FIGS. 1 and 5, the index gate 100 is shown in greater detail. The index gate 100 comprises a main housing 102, a sprocket 104, a drive means 110, a detent mechanism 112, a reader rotate wheel 114, and a translation assembly 116. The sprocket 104 is rotatably mounted on the main housing 102. The reader rotate wheel 114 is rotatably coupled to the drive means 110. The sprocket 104 is rotatably coupled to the reader rotate wheel 114 due to the sliding friction between the lower surface of the reader rotate wheel 114 and the upper surface of the sprocket 104. The sprocket 104 and the reader rotate wheel 114 rotate about the drive means 110. According to one embodiment, the reader rotate wheel 114 comprises hub setscrews to couple the reader rotate wheel 114 to the drive means 110. Thus, the extent of the torque transferred to the sprocket 104 is dependent upon the position of the reader rotate wheel 114 when the reader rotate wheel 114 hub setscrews are tightened. As will be described in reference to FIG. 5, a washer (e.g. Teflon™ washer) 538 and a first friction ring 536 (e.g. o-ring) may be placed between the reader rotate wheel 114 and the sprocket 104 to provide slip coupling and make the torque coupling between the reader rotate wheel 114 and the sprocket 104 easier. According to an alternative embodiment, the drive means 110 is further frictionally coupled to the sprocket 104 (e.g. via hub setscrews) such as to rotate the sprocket 104 until restrained by the detent mechanism 112.

Referring again to FIGS. 1 and 5, the translation assembly 116 is disposed on the housing 102 and the detent mechanism 112 is rotatably coupled to the translation assembly 116.

The main housing 102 is configured for attachment to the conveyor line 250 via the attachment means 302 (FIG. 3) and is preferably attached adjacent a path of travel of the conveyor line 250 indicated as 204 (FIG. 2). The housing 102 is positioned relative to the conveyor line 250 to allow engagement of the index gate 100 with the articles 202. It will be understood that the illustrated path 204 is exemplary and other paths of travel may be implemented.

Referring again to FIGS. 1 and 5, the sprocket 104 includes a plurality of teeth or spokes 106 annularly formed thereon and is rotatably mounted on the housing 102. Each pair of teeth 106 define a concave surface such as a gullet 108 or other type of throat portion therebetween. Preferably, the gullet 108 is sized to freely accommodate each of the anticipated articles 202 travelling in a path of travel generally illustrated as path 204 along the conveyor line 250. It is noted that the path of travel 204 can be in any direction and the direction shown in FIG. 2 is exemplary. For example, in order to accommodate the opposite conveyor travel direction as that shown by the path of travel 204 (FIG. 2), then the translation assembly 116 and the detent mechanism 112 are rotated 180 degrees (as compared to FIG. 2) to provide the conveyor direction change. In one embodiment, the concave-shaped gullets 108 have equally sized depths relative to the teeth 106 and are formed between a number of annularly equidistant teeth 106 which are formed on an outer periphery of the sprocket 104. In one embodiment, the articles 202 may be retained in place both horizontally and vertically by conveyor rails (not shown) placed on the conveyor line 250. Further, according to another embodiment, a protrusion/groove is formed on the surface of each gullet 108 (not shown) and is sized to engage a corresponding protrusion/groove formed on each of the articles 202. According to an alternate embodiment, the protrusion/groove formed on the gullets 108 and the corresponding articles 202 may be used in conjunction with the conveyor rails on the conveyor line 250 to retain the articles 202 within the gullets 108 and maintain alignment of the articles 202 along the conveyor line 250.

The drive means 110 is coupled to the sprocket 104 and to the reader rotate wheel 114 by a slip friction coupling between the sprocket 104 and the reader rotate wheel 114. As illustrated in FIG. 5, the slip friction coupling between the sprocket 104 and the reader rotate wheel 114 may include for example, the first friction ring 536 (e.g. o-ring) and the washer 538. As will be understood by a person skilled in the art, other types of slip friction coupling may be used between the reader rotate wheel 114 and the sprocket 104. As will be discussed, the rotational force used to rotate the sprocket 104 comes from the moving conveyor line 250 (e.g. the articles 202 travelling along the conveyor line engaging the sprocket 104 and facilitating its rotation) and the reader rotate wheel 114.

The drive means 110 is operable to rotate the sprocket 104 and the reader rotate wheel 114 about an axis substantially perpendicular to the path of travel 204 of the articles 202. Further, the drive means 110 rotates the sprocket 104 in a direction of rotation such that a corresponding received article 203 maintains movement along said path of travel 204. For example, when the path of travel 204 is as indicated in FIG. 2, the drive means 110 rotates the sprocket in a counter-clockwise direction.

The rotation of the sprocket 104 is further controlled via the detent mechanism 112 which is rotatably disposed on the housing 102 and slidably coupled to the sprocket 104. The detent mechanism 112 releasably engages and thereby restrains the sprocket 104 against further rotation. That is, when the detent mechanism 112 engages the sprocket 104, thus substantially stopping rotation of the sprocket 104, the reader rotate wheel 114 continues to turn to ensure that the received article 203 rotates to the desired position such that it can be examined further (also referred to as a scanning index position). During this time that the reader rotate wheel 114 rotates without the sprocket 104 rotating, the coupling between the sprocket 104 and the reader rotate wheel 114 will slip. That is, when the sprocket 104 is restrained from rotating, the corresponding received article 203 is retained at a predetermined position (referred to as an index position herein). In this position, the longitudinal movement of the received article 203 along the length of the conveyor line 250 (FIG. 2) is minimized. However, as described, the received article 203 is able to rotate further via the reader rotate wheel 114 to achieve the desired position for scanning (the scanning index position). In this manner, the index gate 100 controls the flow of articles 202 and substantially inhibits further movement of the received article 203 along the conveyor line 250 to allow subsequent examination and identification thereof.

In one embodiment, the index position is such that one of the gullets 108 of the sprocket 104 is positioned directly over the conveyor line 250 and that a line projected from said gullet's 108 center to the center of the hub of the sprocket 104 is substantially perpendicular to the horizontal movement of the conveyor line 250 (FIG. 2).

Referring again to FIGS. 1 and 5, the translation assembly 116 is in communication with the detent mechanism 112 and is disposed on the housing 102. The translation assembly 116 controls the movement of the detent mechanism 112 and causes it to engage the sprocket 104 and retain it in the index position or to release the sprocket 104 such as to allow actuation to a subsequent index position. That is, the translation assembly 116 causes the detent mechanism 112 to engage each one of the teeth 106 as the sprocket 104 rotates in order to allow for subsequent identification of the received article 203 by the reader subassembly 206.

It is further noted that the dimension of the sprocket 104 outer diameter, the gullet 108 depth, and teeth 106 width allow the in-process article 201 to be physically separated from the queue of articles 202 behind it. Preferably the clearance is approximately 0.050". Thus, the clearance prevents the horizontal pressure from the queue to affect the in-process article 201.

Figure 4:
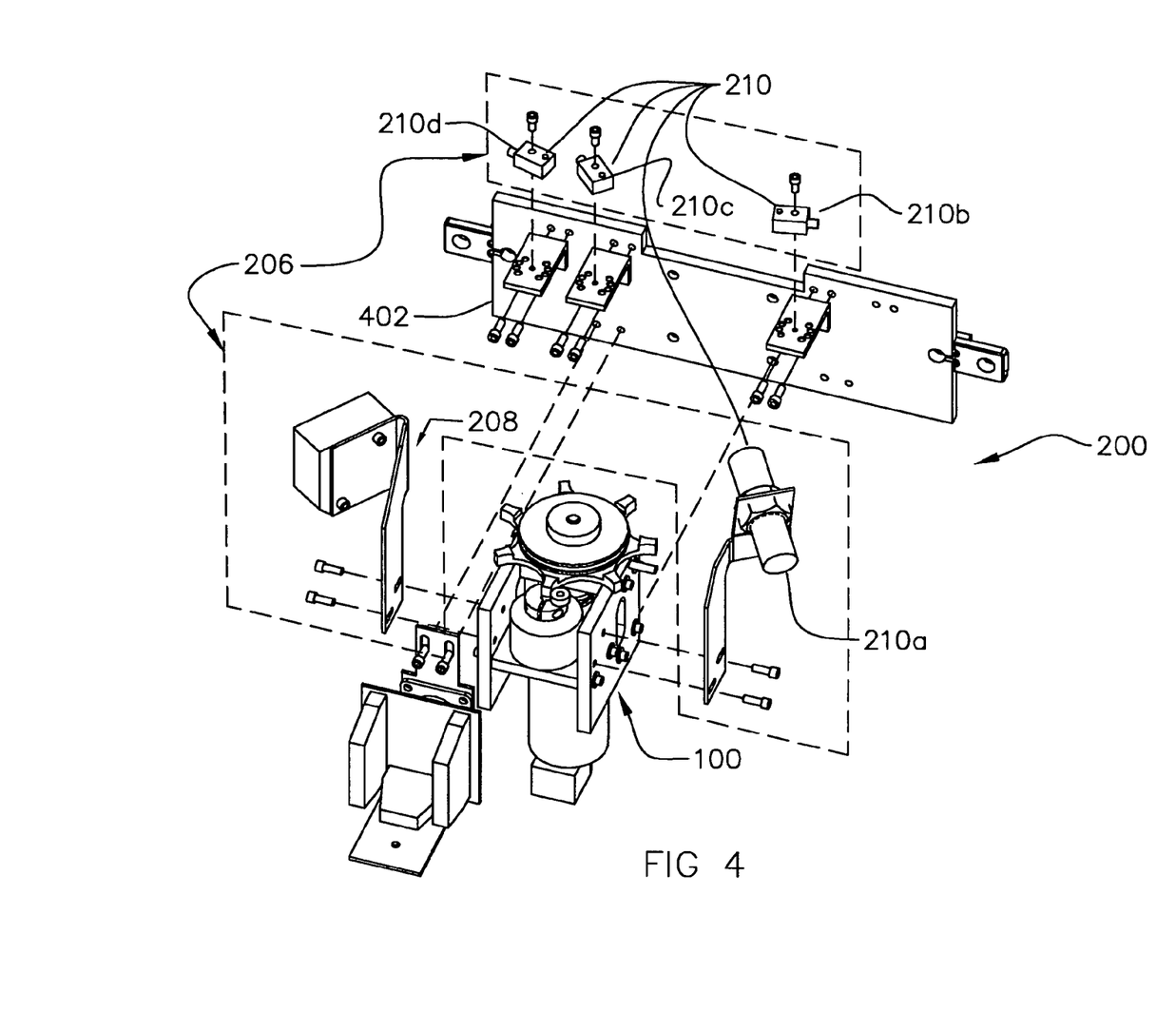
FIG. 4 is a partially exploded isometric view of the gate reader assembly of FIG. 2 depicting reader and sensing assemblies configured for attachment to the gate subassembly of FIG. 1.

Referring to FIGS. 2-4, there is illustrated the reader subassembly 206 for use with the index gate 100. The reader subassembly 206 is disposed on the housing 102 and positioned for sensing that the received article 203 is retained in the index position. At this point, the received article 203 may then be rotated further by the reader rotate wheel 114 so that the received article 203 can be scanned and examined (e.g. also referred to as a scanning index position).

According to one embodiment, the reader subassembly 206 comprises a barcode scanner 208 and one or more sensors 210 as illustrated in FIG. 4. For example, sensor 210a detects the presence of the received article 203 at the index position and is used to determine if a barcode read cycle is desired at this position. Further, a plurality of diffuse light optical sensors such as photoelectric sensors (e.g. sensors 210b, 210c, 210d) may be used to determine the progress of the articles 202 on the conveyor line 250. In one configuration, a first sensor 210b detects the presence of a specific article 202 at the leading edge (upstream) spoke 106 of the index gate 100 when the sprocket 104 is in the index position. A second sensor 210c detects the presence of the received article 203 positioned in the index position. A third sensor 210d detects the presence of a specific article at the exit (downstream) of the index gate 100. Referring to FIG. 5, the index gate 100 may further comprise a trigger member 542 and a metal sensing proximity sensor 516. The trigger member 542 is operable to trigger the metal sensing proximity sensor 516 to determine the positioning of the sprocket 104. It will be understood by a person skilled in the art, that the sensors illustrated in FIGS. 4 and 5 are exemplary and numerous other configurations may be envisaged as understood by a person skilled in the art. For example, the scanner 208 may be combined with one or more of the sensors 210 to provide simultaneous sensing and reading of articles 202.

In operation, the drive means 110 rotates the reader rotate wheel 114 causing the sprocket 104 to rotate until one of the teeth 106 (e.g. index tooth 107) is engaged by the detent mechanism 112. This causes the forward movement of the received article 203 along the travel path 204 to be stopped. Once the forward movement of the received article 203 is stopped along the conveyor line 250, the reader rotate wheel 114 continues to rotate the received article 203 to align it for subsequent identification by the reader subassembly 206. In one embodiment, while the received article 203 rotates, the barcode scanner 208 aimed at the received article 203 reads the barcode label or other identification means of the received article 203. Preferably, after the barcode data is processed, the index gate 100 releases the received article 203 along the conveyor line 250 and the process repeats itself with the next article 202.

Detailed Example and Operation of the Index Gate 100

Referring to FIG. 5, shown is an exploded isometric view of one embodiment of the index gate 100 shown in FIG. 1. As discussed earlier, the index gate 100 includes the main housing 102, the sprocket 104, the drive means 110, the detent mechanism 112, the reader rotate wheel 114 and the translation assembly 116.

As discussed, the sprocket 104 is adapted to engage articles 202 to provide the desired positioning for identification of the articles 202. In one embodiment, the sprocket 104 used is shaped similar to a sprocket of a chain. It will be understood that other types of sprockets may be used as understood by a person of ordinary skill in the art. Such sprockets may include for example, a rotatable starwheel having at least one slot or pocket disposed around the annular periphery thereof and shaped to receive containers moved by the conveyor line.

As discussed earlier, the sprocket 104 contains teeth 106 and gullets 108. In one embodiment shown in FIG. 5, this may include seven teeth and corresponding gullets sized to engage articles 202. It will be understood that the dimension of the sprocket 104 is varied depending on the diameter of the articles 202 to be received. As discussed earlier, the sprocket 104 outer diameter, the gullet 108 size and sprocket 104 teeth width are set so that the in-process article 201 is separated from the queue of articles 202 behind it.

The outer dimensions of the sprocket 104 and the center point of its gullets 108, are sized to account for the desired horizontal and vertical alignment of the sprocket 104, such as to allow the articles 202 travelling on the conveyor line 250, such as specimen sample carriers to pass freely as the sprocket 104 is turning.

As discussed earlier, the gullets 108 are sized to engage the articles 202 on the conveyor line 250. For example, the gullets 108 have a radius sized to mate with the outer dimension of round or cylindrical articles 202 such as those used for specimen sample carriers.

Preferably, the gullets 108 and the teeth 106 of the sprocket 104 are sized for adequate clearance between adjacent articles 202 such as sample carriers. In one example, the center point of the gullets 108 as well as the outer diameter of the sprocket 104 is dimensioned such that the received article 203 positioned downstream of the in-process article 201 is separated by a pre-determined clearance. This clearance allows the in process article 201 to rotate freely as will be described without causing jamming. Further, the sprocket 104 may be used with any type of circular carriers such as the RRUSH™ specimen sample carriers. However, as will be understood by a person skilled in the art, the gullets 108 may also accommodate articles 202 such as a round carrier with an internal top recess capable of having other types of profiles.

In the embodiment illustrated, the index gate 100 further comprises a first ball bearing 502, a drive shaft 504, a second ball bearing 506, a horizontal plate 508, and two side plates 510, 512 defining the lateral sides of the housing 102 and adapted to be assembled to the attachment means 302. The first ball bearing is disposed on the hub of the sprocket 104 for allowing rotation thereof on the drive shaft 504. The shaft 504 is held in vertical orientation by the second ball bearing 506 mounted on the substantially horizontal plate 508. The horizontal plate 508 is adapted for transverse connection between the two side plates 510, 512 which define the sides of the housing 102. These two side plates 510, 512 are adapted to be assembled to the attachment means 302 such as a large mounting plate 402 (FIG. 4) which is configured for attachment to the conveyor 250 alongside the path of travel (e.g. 204).

As discussed earlier, in order for the gate reader assembly 200 to process and examine the received article 203, the article's horizontal movement on the conveyor line 250 is stopped at the index position. For example, in the case where the sprocket 104 consists of seven teeth 106 and gullets 108, this index position will occur seven times per revolution of the sprocket 104.

Referring again to FIG. 5, in the embodiment illustrated, the translation assembly 116 comprises a brushless torque actuator 514 having a drive shaft 520 and a lower end shaft 530, a mounting plate 518, one or more rubber washers 526 and a shaft collar 528 that is configured for adjustable attachment to the lower end shaft 530. As illustrated in FIG. 5, the one or more rubber washers 526 and the shaft collar 528 are configured for adjustable attachment to the lower end shaft 530 of the torque actuator 514 and the mounting plate 518 such as to dampen the rotary movement of the torque actuator 514 and reduce noise.

According to the present embodiment, the translation assembly 116 comprises an electromagnetic device (e.g. the brushless torque actuator 514 disposed on a mounting plate 518) that translates electrical current into rotary shaft movement in order to provide stopping of the sprocket 104 and the corresponding teeth 106 and gullet 108 at the index position. However, other types of electromagnetic devices providing such translational movement may be provided. The drive shaft 520 provided by the torque actuator 514 is positioned such that the shaft 520 centerline lies on the perpendicular line from the conveyor line 250 and its rotation is internally limited to approximately 45 degrees.

Referring again to FIG. 5, the detent mechanism 112 further comprises a collar 522 and an actuator bearing 524. The collar 522 is adapted for coupling to the shaft 520 of the torque actuator 514. Positioned on this collar 522 and offset from the sprocket 104 centerline is the horizontally mounted actuator bearing 524. As shown in FIG. 1, when positioned in the index position, the outer surface of the bearing 524 rests on the outer edge of an index gullet 109, thus stopping and holding the sprocket 104 in the desired position. Thus, the actuator bearing 524 serves as a detent bearing. The horizontal positioning of the torque actuator 514 relative to the sprocket 104 may be performed to fine tune the index position. Thus, the actuator bearing 524 reduces the amount of torque needed from the torque actuator 514 to provide rotation thereof.

Exemplary Operation of the Gate Reader Assembly 200

The operation of the gate reader assembly 200 in providing the desired positioning of the sprocket 104 is as follows and provided in reference to FIGS. 1, 5 and 6. When gate indexing is desired from the index gate 100 (e.g. such that the next index gullet 109 engages the bearing 524 to provide the desired index position), then current is fed through the torque actuator 514. This current causes the collar 522 and actuator bearing 524 to rotate away from the index centerline 602 shown in phantom lines on FIG. 6. Further, the horizontal force on the received article 203 resulting from the friction between the horizontally moving conveyor 250 and the bottom surface of the received article 203, forces the sprocket 104 to rotate in the direction of the conveyor 250 (FIG. 2). As discussed earlier, the sprocket 104 rotates due to the horizontal force from the conveyor line 250 and the coupling with the reader rotate wheel 114. As described earlier, the slip coupling between the reader rotate wheel 114 and the sprocket 104 (e.g. the slip coupling consisting of a washer 538 and a first friction ring 536) causes the reader rotate wheel 114 to frictionally engage the sprocket 104. This causes the sprocket 104 to rotate with the reader rotate wheel 114 via the drive means 110. As discussed earlier, further rotational torque on the received article 203 is provided by the reader rotate wheel 114 which rotates the received article 203 to provide the desired positioning of the received article 203 such that the associated barcode/label may be scanned.

Figure 6:
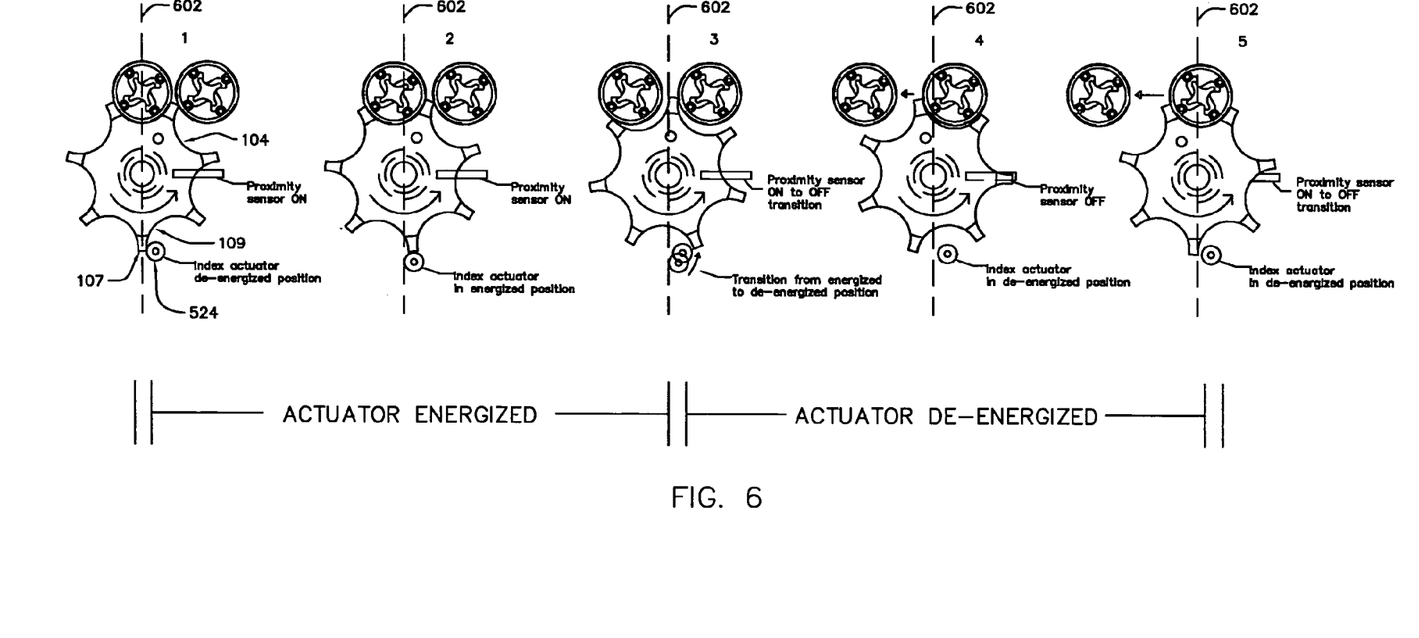
FIG. 6 is a sequence drawing illustrating the operational sequence of the gate reader assembly.

Referring again to the sequence drawing in FIG. 6, the torque actuator 514 is adapted to remain energized from the index position where the index gullet 109 is engaged by the actuator bearing 524 until the sprocket 104 (e.g. the index gullet 109) rotates far enough so the sprocket's index tooth 107 completely passes by the actuator bearing 524. As shown in FIG. 6, when this occurs, power to the torque actuator 521 is temporarily de-activated and the actuator bearing 524 returns to its resting position, causing the next index tooth 109 to stop at the index position.

Once the desired positioning of the sprocket 104 is obtained (e.g. the index position), the reader rotate wheel 114 is used to rotate the received article such as to read the barcode or other identifier of the received article 203. The reader rotate wheel 114 is preferably mounted above and on the same drive shaft 504 that supports the sprocket 104. This results in the rotational center of the two parts to be substantially aligned. The reader rotate wheel 114 includes a slot in its rim, into which two or more flexible compound rubber washers 115 are inserted. In the embodiment illustrated in FIG. 5, the reader rotate wheel 114 further comprises a second friction ring 117 which receives the washers 115. The second friction ring (e.g. an o-ring) improves rotational consistency of the reader rotate wheel 114.

The washers 115 are sized such that before a received article 203 reaches the index position, the outer rim of the washers 115 will rub on the side of the received article 203 in order to rotate the article 203. For example, the washers 115 used may be made of soft neoprene rubber such as to allow the washers 115 to compress at its rim to conform to the received article 203. According to the present embodiment, contact between the washers 115 and the received article 203 may occur before and after the index position. In one scenario, when the reader rotate drive motor 532 is energized, motor shaft rotation is transferred through the shaft coupling assembly 534 to the drive shaft 504. The reader rotate wheel 114 causes the received article 203 to rotate as well. Thus, during this rotation, the barcode scanner 208 (or other scanning mechanism known in the art), is aimed at the barcode label or other identification means located on the received article 203 in order to read the barcode label and identify the received article 203.

In an alternate embodiment, the sprocket 104 rotates on its own without the coupling between the reader rotate wheel 114 and the sprocket 104 causing its rotation. In this case, the rotation of the sprocket 104 is facilitated by the horizontal force provided by the moving conveyor line 250 and the plurality of articles 202 travelling on the conveyor line 250 which each engage the sprocket 104 and cause the sprocket 104 to advance when the conveyor line 250 is moving.

It will be evident to those skilled in the art that the invention can take many forms, and that such forms are within the scope of the invention as claimed. Therefore, the spirit and scope of the appended claims should not be limited to the description of the preferred versions contained herein.

The invention claimed is:

1. A gate reader assembly configured to identify articles travelling on a conveyor, the gate reader assembly comprising:
   a main housing configured for attachment to said conveyor adjacent a conveyor line of the conveyor;
   a sprocket rotatably mounted on said housing and having a plurality of gullets formed thereon, each gullet configured for receiving one of said articles, said sprocket configured to rotate about an axis normal to said conveyor line via a horizontal force from said articles, said rotating sprocket configured to receive and move said articles along said conveyor line;
   a detent mechanism disposed on the housing and slidably coupled to the sprocket for releasably restraining said sprocket from rotation thereby inhibiting said article against further movement along said conveyor line; and
   a reader subassembly configured for mounting on said housing and for identifying said articles when restrained.

2. A gate reader assembly according to claim 1 further comprising:
   a reader rotate wheel and a drive means configured for rotating said reader rotate wheel such that said reader rotate wheel frictionally engages and rotates said article when restrained.

3. A gate reader assembly according to claim 2 wherein said drive means is further coupled to said sprocket for rotating said sprocket in conjunction with said horizontal force.

4. A gate reader assembly according to claim 3 wherein said drive means is coupled to the sprocket via the reader rotate wheel.

5. A gate reader assembly according to claim 4 wherein the sprocket is coupled to the reader rotate wheel via torque coupling.

6. A gate reader assembly according to claim 5 wherein the torque coupling comprises a frictional slip coupling for causing said drive means to rotate said sprocket with said reader rotate wheel along said axis until restrained.

7. A gate reader assembly according to claim 6, wherein said frictional slip coupling comprises a friction ring and at least one washer positioned between said reader rotate wheel and said sprocket.

8. A gate reader assembly according to claim 6, wherein said reader rotate wheel comprises hub setscrews for coupling said reader rotate wheel to said drive means at a predetermined position relative to said sprocket, the predetermined position defining said torque coupling between the reader rotate wheel and the sprocket.

9. A gate reader assembly according to claim 2, wherein said sprocket comprises a plurality of teeth annularly formed thereon each pair of teeth defining the corresponding gullet therebetween, said gullets and teeth sized to accommodate a predefined clearance between said received article and adjacent articles.

10. A gate reader assembly according to claim 9, wherein each gullet has a radius sized to mate with each said article's outer diameter.

11. A gate reader assembly according to claim 9 further comprising a translation assembly disposed on said housing and coupled to the detent mechanism for reciprocably moving said detent mechanism to releasably engage each one of said teeth and restrain said article.

12. A gate reader assembly according to claim 11, wherein said translation assembly comprises an electromagnetic actuator having a drive shaft coupled to said detent mechanism, said electromagnetic actuator configured to move said detent mechanism between a de-energized position wherein said detent mechanism rotates towards said sprocket for subsequent frictional engagement therewith and an energized position wherein said detent mechanism rotates away from said sprocket for unengagement therewith.

13. A gate reader assembly according to claim 12 wherein said electromagnetic actuator comprises a brushless torque actuator.

14. A gate reader assembly according to claim 12, wherein said detent mechanism further comprises a collar rotatably coupled to said drive shaft and an actuator bearing disposed thereon offset from said drive shaft, said collar operable to rotate about said drive shaft within a predetermined range to move said actuator bearing between said energized and de-energized position.

15. A gate reader assembly according to claim 1, wherein each said gullet comprises a protrusion for engaging a corresponding groove on said received article for positioning said article within said gullet.

16. A gate reader assembly according to claim 1, wherein said reader subassembly comprises a plurality of sensors for detecting positioning of said received article and at least one scanner for scanning and identifying said received article when restrained.

* * * * *